United States Patent
He et al.

(10) Patent No.: US 10,617,252 B2
(45) Date of Patent: Apr. 14, 2020

(54) ELECTRIC PRESSURE COOKER WITH AUXILIARY HEATER

(71) Applicant: Foshan Shunde Aide Industry Co., Ltd., Foshan (CN)

(72) Inventors: Zhigang He, Foshan (CN); Hui Zheng, Foshan (CN)

(73) Assignee: Foshan Shunde Aide Industry, Foshan (CN)

( * ) Notice: Subject to any disclaimer, the term of this patent is extended or adjusted under 35 U.S.C. 154(b) by 403 days.

(21) Appl. No.: 15/619,453

(22) Filed: Jun. 10, 2017

(65) Prior Publication Data
US 2018/0116438 A1 May 3, 2018

(30) Foreign Application Priority Data
Oct. 28, 2016 (CN) .................... 2016 2 1197209 U

(51) Int. Cl.
| | |
|---|---|
| *A47J 27/08* | (2006.01) |
| *A47J 27/00* | (2006.01) |
| *A47J 36/10* | (2006.01) |

(52) U.S. Cl.
CPC ............. *A47J 27/08* (2013.01); *A47J 27/004* (2013.01); *A47J 36/10* (2013.01)

(58) Field of Classification Search
CPC ...... A47J 27/08; A47J 27/0802; A47J 27/086; A47J 27/09; A47J 27/0804; A47J 36/10; A47J 27/090804; A47J 27/092
See application file for complete search history.

(56) References Cited

U.S. PATENT DOCUMENTS 3,583,307 A * 6/1971 Lee, Sr. .................. A47J 27/08
99/333
3,940,589 A * 2/1976 Tupper .................. A47J 27/004
219/433

* cited by examiner

*Primary Examiner* — Shawntina T Fuqua
(74) *Attorney, Agent, or Firm* — CBM Patent Consulting, LLC

(57) ABSTRACT

It discloses an electric pressure cooker with auxiliary heater, comprising pot cover subassembly, pot body subassembly, built-in heating plate subassembly and inner pot subassembly, characterized in that the said inner pot subassembly comprises inner pot, auxiliary heater and connector plug corresponding to auxiliary heater, the pot body is provided with connector socket corresponding to connector plug.

9 Claims, 7 Drawing Sheets

ELECTRIC PRESSURE COOKER WITH AUXILIARY HEATER

This application claims priority to Chinese Patent Application Ser. No. CN201621197209.2 filed on 28 Oct. 2016.

TECHNICAL FIELD

This invention relates to the filed of household appliances technology, particularly to an electric pressure cooker.

BACKGROUND ART

The electric pressure cooker is an upgrade product of traditional pressure cooker and electric cooker. It combines the merits of pressure cooker and electric cooker, adopts new techniques such as elastic pressure control, with dynamic packing, outer spiral cover, adjustable electric switch. With new structure, full-sealed cooking, continuously adjustable pressure, it thoroughly solves the safety problem of pressure cooker, avoids potential safety hazard of ordinary pressure cooker which troubles consumers for years; its thermal efficiency is higher than 80%, which saves time and power (it saves more than 30% power than ordinary electric cooker). Usually, an electric pressure cooker heats the food of inner pot in the way of thermal transmission through heating plate at external bottom of the inner pot, generates steam to form pressure in an sealed space, then under the pressure the boiling point of water rises with the rising pressure, thus the pot will generate cooking temperature of about 118° C. to cook food quickly. However the cooking method of the pot is singular, the cooking temperature cannot be too high under sealed condition, otherwise it will generate very great pressure and easily cause damage to the pot structure.

SUMMARY OF THE INVENTION

The objective of this invention provide an electric pressure cooker with auxiliary heater featured by simple structure, easy use, good stability, so as to solve the shortcomings of the prior art and to boost the cooking temperature and cook food more quickly.

This invention adopts the following technical solution to achieve the above objective: An electric pressure cooker with auxiliary heater, comprising pot cover subassembly, pot body subassembly, built-in heating plate subassembly and inner pot subassembly, characterized in that the said inner pot subassembly comprises inner pot, auxiliary heater and connector plug corresponding to auxiliary heater, the pot body is provided with connector socket corresponding to connector plug. During heating, auxiliary heater can achieve direct heating of food; it can heat spice and make the effect of fuming food; it can reheat steam inside the pot, so as to form superheated steam, increase cooking temperature, and make food cook thoroughly more quickly; it can assist with the bottom heater to heat water directly in the pot, increase convection points, make up the shortcoming of insufficient convection of single heater and unequal water temperature, so that while cooking at low temperature within the temperature range of 50-70° C., water temperature in the pot will be more steady and balanced.

As further description of the above invention, the said auxiliary heater comprises charging barrel, barrel cover, heating tube subassembly, joint of heating tube subassembly and connector plug.

Further, heating tube subassembly comprises tube shell, resistance thermal fuse, current-conducting rod, heating tube conducting pillar, resistance thermal fuse is provided in the inner middle of tube shell, insulative materials are filled up between the inner wall of tube shell and resistance thermal fuse, the tube nozzle is encapsulated with insulative damp-proof silica gel, the two ends of resistance thermal fuse are winded at the current-conducting rod.

Further, the two ends of said heating tube subassembly are welded at a heating tube pedestal, the heating tube pedestal is welded with four screw bolts, and the bottom of heating tube pedestal is stacked up with silica gel pad; the bottom center of inner pot is provided with a raised platform with apertures; the tube shell of heating tube subassembly penetrates through apertures from the inner pot, connector plug is fixed at the corresponding place outside the inner pot, and the parts are fastened with nuts.

Further, connector plug comprises connector plug shell and built-in heating tube conducting pillar, conducting pillar for temperature sensor and grounded conducting pillar, heating tube conducting pillar is connected with current-conducting rod, conducting pillar for temperature sensor is connected with thermistor, the shell of connector plug is provided with heating tube pedestal cover corresponding to heating tube subassembly, various conducting pillars penetrate heating tube pedestal cover and are pressed with thermistor silica gel pad, then they are fastened with lock catch on the outer shell of connector plug.

Further, the said connector socket comprises connector assembly, bayonet cap, connector assembly built-in shrapnel subassembly, plugboard, spring, mutually corresponding locating pins are designed in the middles of connector assembly and bayonet cap, connector assembly and bayonet cap are distributed up and down, the upper part of spring is knotted into locating pins of connector assembly, the lower part of spring is knotted into locating pins of bayonet cap.

Further, the said shrapnel subassembly comprises conducting shrapnel, wiring conducting strip connected with conducting shrapnel, conducting shrapnel and wiring conducting strip riveted with rivets.

Further, the said locating pins are designed with inner cavity, provided with grounded shrapnel, grounded shrapnel connected with wiring conducting strip, grounded shrapnel fixed with bolts to the center of bayonet cap; the upper part of bayonet cap fixed with screws to connector assembly.

Further, the said pot body comprises shell subassembly, pedestal subassembly and heat preservation hood subassembly, the upper limb of pot body is provided with upper seat corresponding to pot cover, and shell subassembly comprises shell, control panel and pot body handle; pedestal subassembly comprises pedestal and baseplate fixed onto the pedestal; heat preservation hood subassembly comprises heat preservation hood, middle ring, pressure switch and support, the upper limb of heat preservation hood is designed with outstretched turnup, embedded with middle ring; the shell is fixed between pedestal and upper seat, heat preservation hood is fixed between inner pot and pot body, connector socket is provided on the heat preservation hood; heating plate subassembly comprises heating plate, plate spring fixed at the downside of heating plate, pressure switch and support fixed below heat preservation hood, with flexible connection onto heating plate.

Further, the said inner pot is provided with cooking shelf, whose middle is designed with apertures for penetration of auxiliary heater.

The beneficial effects which can be achieved by this invention through the adoption of the said technical solution:

This invention adopts the method of designing auxiliary heater inside the inner pot, so as to heat food directly through thermal radiation of auxiliary heater; it can heat spice and make the effect of fuming food; it can reheat steam inside the pot, so as to form superheated steam, increase cooking temperature, and make food cook thoroughly more quickly; it can assist with the bottom heater to heat water directly in the pot, increase convection points, make water temperature in the pot more steady and balanced, so as to be suitable for cooking at low temperature within the temperature range of 50-70° C.

Figure 1:
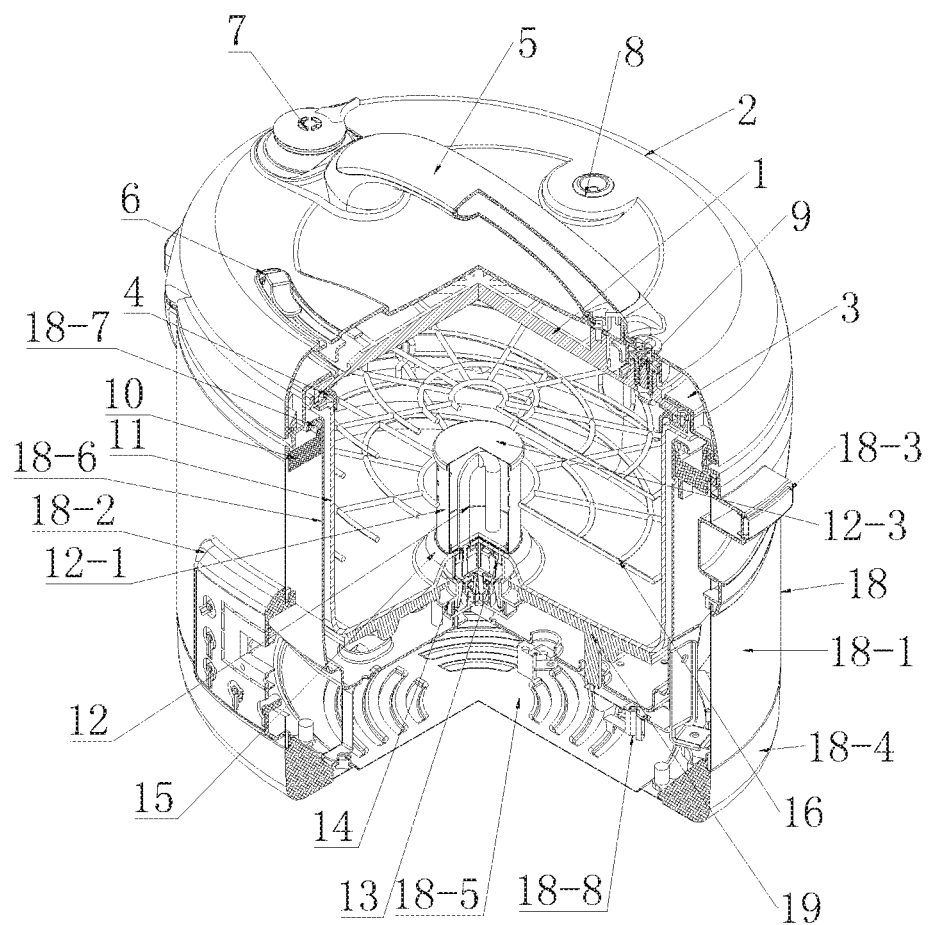
FIG. 1 is a schematic view of the structure of the invention.
Figure 2:
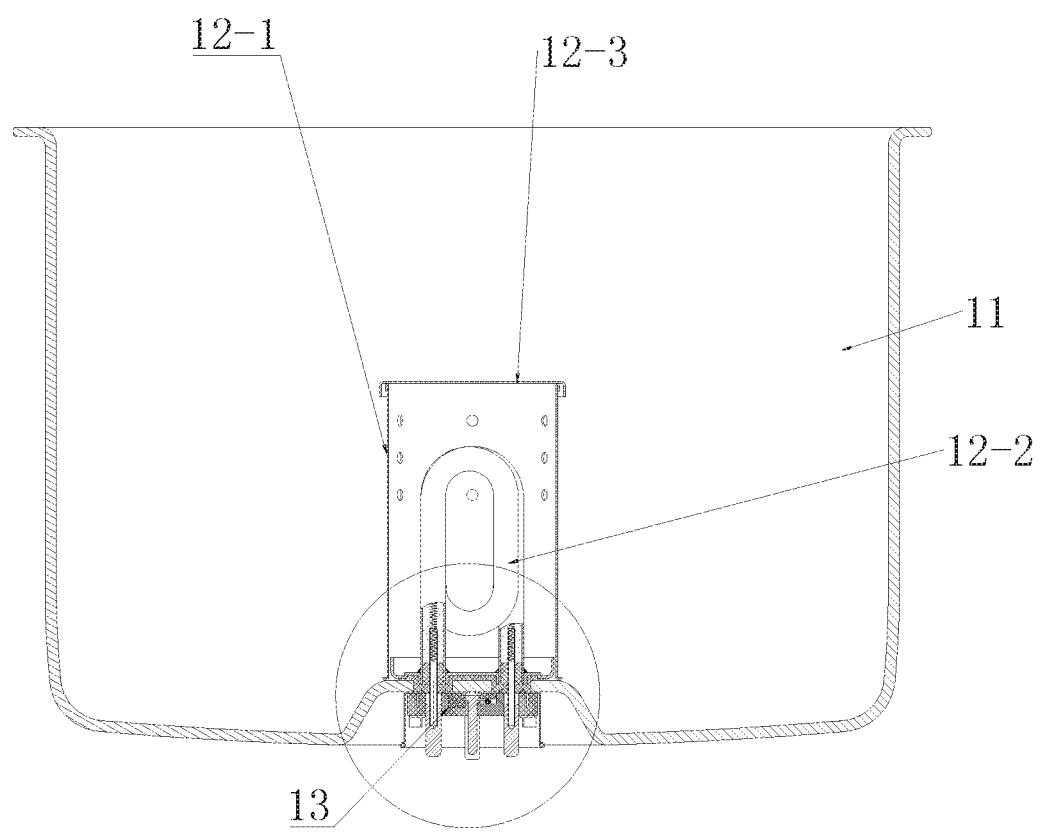
FIG. 2 is a structural drawing of inner pot installed with auxiliary heater.
Figure 3:
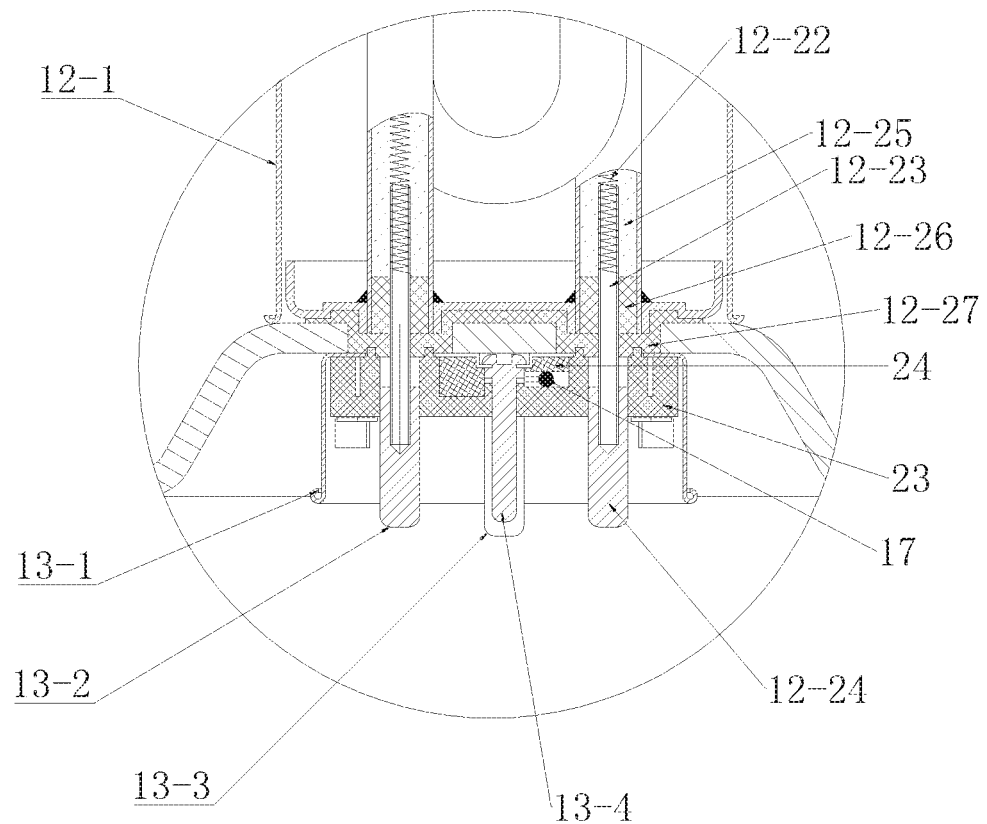
FIG. 3 is a locally magnified view of FIG. 2.
Figure 4:
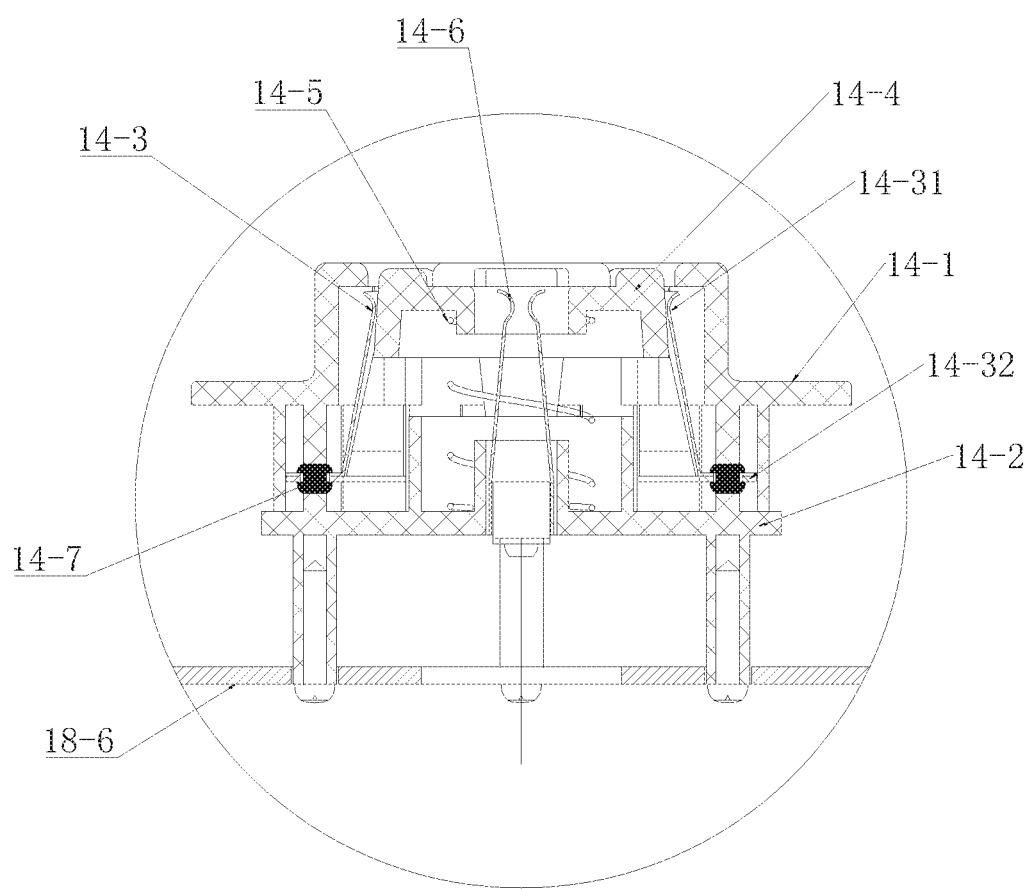
FIG. 4 is a structural drawing of connector socket.
Figure 5:
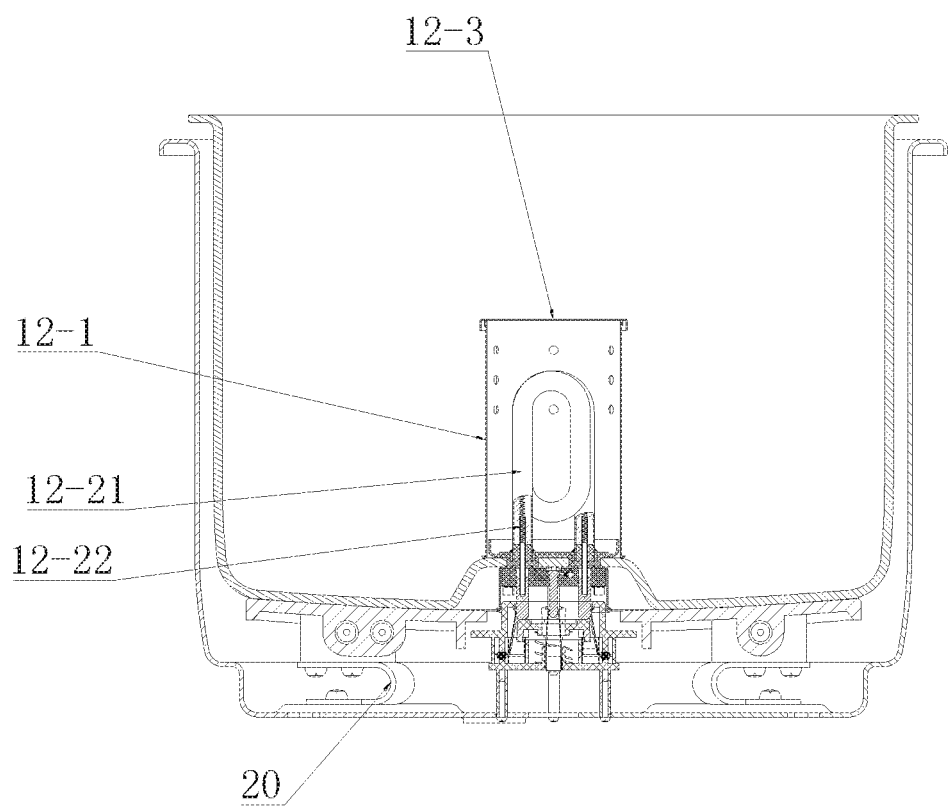
FIG. 5 is a structural drawing of coupled inner pot into the pot body.
Figure 6:
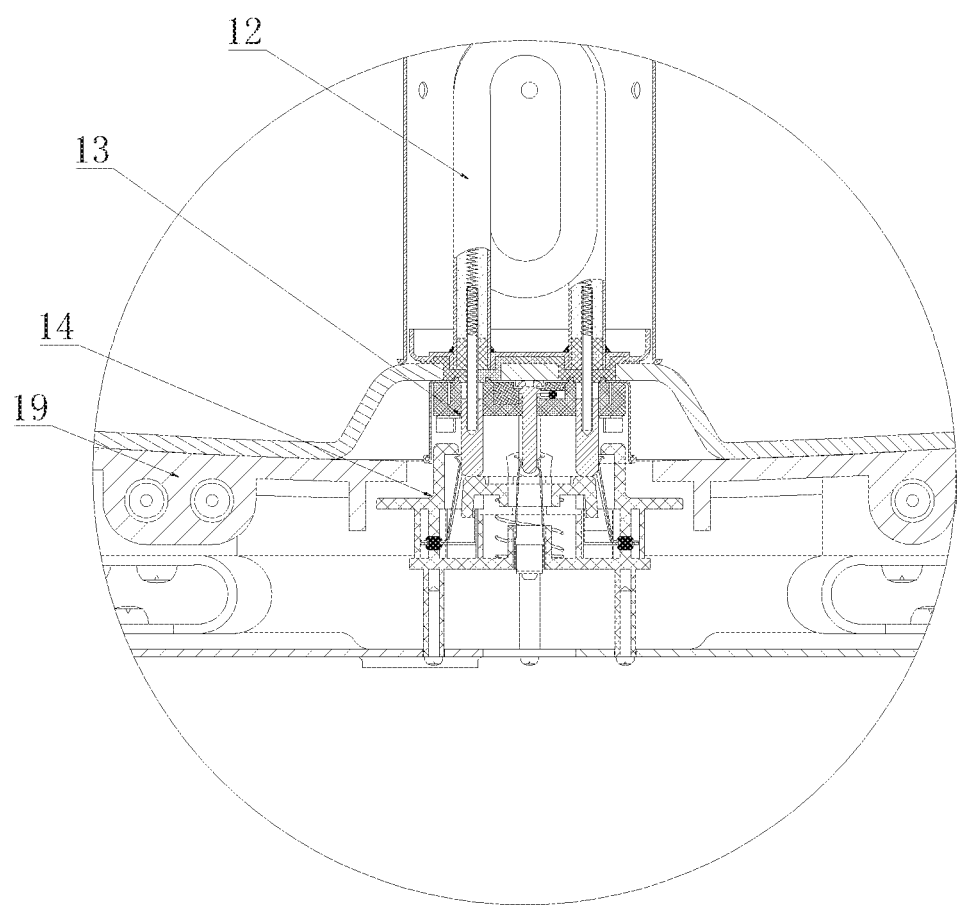
FIG. 6 is a locally magnified view of FIG. 5.

Explanation of symbols in the drawings: 1. metal pot cover 2. plastic surface cover 3. plastic lining cover 4. seal ring 5. pot cover handle 6. cover deflector rod 7. vent valve 8. ball float valve 9. safety valve 10. upper seat 11. inner pot 12. auxiliary heater 12-1. charging barrel 12-2. heating tube subassembly 12-21. tube shell 12-22. resistance thermal fuse 12-23. current-conducting rod 12-24. heating tube conducting pillar 12-25. insulative materials 12-26. insulative dampproof silica gel 12-27. tube pedestal silica gel pad 12-3. barrel cover 13. connector plug 13-1. shell of connector plug 13-2. heating tube conducting pillar 13-3. conducting pillar for temperature sensor 13-4. grounded conducting pillar 14. connector socket 14-1. connector assembly 14-2. bayonet cap 14-3. shrapnel subassembly 14-31. conducting shrapnel 14-32. wiring conducting strip 14-4. plugboard 14-5. spring 14-6. grounded shrapnel 14-7. rivet 15. platform 16. cooking shelf 17. thermistor 18. pot body 18-1. shell 18-2. control panel 18-3. pot body handle 18-4. pedestal 18-5. baseplate 18-6. heat preservation hood 18-7. middle ring 18-8. pressure switch and support 19. heating plate 20. plate spring 21. circuit board for operation display 22. power supply and in-out circuit board 23. heating tube pedestal cover 24. thermistor silica gel pad 25. connector.

DETAILED DESCRIPTION OF THE PREFERRED EMBODIMENTS

The technical solution is described in detail below with reference to the specific embodiments.

As shown in FIG. 1-FIG. 7, this invention is an electric pressure cooker with auxiliary heater, comprising pot cover subassembly, pot body 18 and built-in heating plate subassembly, inner pot subassembly; the pot cover subassembly comprises metal pot cover 1, plastic surface cover 2, plastic lining cover 3, seal ring 4, pot cover handle 5, cover deflector rod 6, vent valve 7, ball float valve 8 and safety valve 9; plastic surface cover and plastic lining cover are fixed on the metal pot cover, pot cover handle is fixed with fastener onto the plastic surface cover and metal pot cover; the plastic surface cover and metal pot cover are designed with apertures for installing vent valve, ball float valve and safety valve, seal ring is embedded at the inner edge of metal pot cover, cover deflector rod is provided between the metal pot cover and plastic lining cover. The upper limb of pot body is provided with upper seat 10 corresponding to the pot cover subassembly.

The inner pot subassembly comprises inner pot 11, auxiliary heater 12 and connector plug 13 corresponding to auxiliary heater; the inside of pot body is provided with connector socket 14 corresponding to connector plug; at the time of heating, the auxiliary heater can heat food directly; it can heat spice and make the effect of fuming food; it can reheat steam inside the pot, so as to form superheated steam, increase cooking temperature, and make food cook thoroughly more quickly; it can assist with the bottom heater to heat water directly in the pot, increase convection points, make water temperature in the pot more steady and balanced, so as to be suitable for cooking at low temperature within the temperature range of 50-70° C. The auxiliary heater 12 comprises charging barrel 12-1, heating tube subassembly 12-2, and heating tube subassembly is connected with connector plug. The top of charging barrel is provided with barrel cover 12-3, the side wall of charging barrel is designed with many apertures. the bottom center of inner pot is provided with a raised platform 15 with apertures; the tube shell of heating tube subassembly penetrates through apertures from the inner pot, connector plug 13 is fixed at the corresponding place outside the inner pot, and the parts are fastened with nuts.

Further, the said inner pot 11 is provided with cooking shelf 16, whose middle is designed with apertures for penetration of auxiliary heater.

The heating tube subassembly 12-2 comprises tube shell 12-21, resistance thermal fuse 12-22, current-conducting rod 12-23, heating tube conducting pillar 12-24; resistance thermal fuse is provided in the inner center of tube shell, insulative materials 12-25 are filled up between inner wall of tube shell and resistance thermal fuse, the tube nozzle is encapsulated with insulative dampproof silica gel 12-26, the two ends of resistance thermal fuse are winded at the current-conducting rod. The two ends of heating tube subassembly are welded at a heating tube pedestal, the heating tube pedestal is welded with four screw bolts, and the bottom of heating tube pedestal is stacked up with silica gel pad 12-27. In this embodiment, the end of current-conducting rod is designed with thread for installing heating tube conducting pillar.

Further, connector plug 13 comprises connector plug shell 13-1 and built-in heating tube conducting pillar 13-2, conducting pillar for temperature sensor 13-3 and grounded conducting pillar 13-4, heating tube conducting pillar is connected with current-conducting rod. The conducting pillar for temperature sensor is connected with thermistor 17. In this embodiment, the two ends are riveted with conducting pillar for temperature sensor respectively. The shell of connector plug is provided with heating tube pedestal cover 23 corresponding to heating tube subassembly, various conducting pillars penetrate heating tube pedestal cover and are pressed with thermistor silica gel pad 24, then they are fastened with lock catch on the outer shell of connector plug.

Further, the said connector socket 14 comprises connector assembly 14-1, bayonet cap 14-2, connector assembly built-in shrapnel subassembly 14-3, plugboard 14-4, spring 14-5, mutually corresponding locating pins are designed in the middles of connector assembly and bayonet cap, connector assembly and bayonet cap are distributed up and down, the upper part of spring is knotted into locating pins of connector assembly, the lower part of spring is knotted into locating pins of bayonet cap. The shrapnel subassembly 14-3 comprises conducting shrapnel 14-31, wiring conducting strip 14-32 connected with conducting shrapnel, conducting shrapnel and wiring conducting strip riveted with rivets. The locating pins are designed with inner cavity, provided with grounded shrapnel 14-6, grounded shrapnel fixed with bolts to the center of bayonet cap; the upper part of bayonet cap fixed with screws to connector assembly. In this embodiment, the inner part of connector socket comprises four conducting shrapnels, which are riveted to wiring conducting strip with rivets 14-7.

Further, the said pot body 18 comprises shell subassembly, pedestal subassembly and heat preservation hood subassembly, the upper limb of pot body is provided with upper seat corresponding to pot cover, and shell subassembly comprises shell 18-1, control panel 18-2 and pot body handle 18-3; pedestal subassembly comprises pedestal 18-4 and baseplate 18-5 fixed onto the pedestal; heat preservation hood subassembly comprises heat preservation hood 18-6, middle ring 18-7, pressure switch and support 18-8, the upper limb of heat preservation hood is designed with outstretched turnup, embedded with middle ring; the shell is fixed between pedestal and upper seat, heat preservation hood is fixed between inner pot and pot body, connector socket is provided on the heat preservation hood; heating plate subassembly comprises heating plate 19, plate spring 20 fixed at the downside of heating plate, pressure switch and support fixed below heat preservation hood, with flexible connection onto heating plate.

Whiling cooking, put the inner pot into pot body. As for the five conducting pillars in the plug at the bottom of inner pot, two of which are conducting pillars for auxiliary heater, the other two of which are conducting pillars for temperature sensor, the remaining one is the grounded conducting pillar. Press them, the grounded conducting pillar is directly inserted into the middle of grounded shrapnel, the other four conducting pillars pin the plugboard first, and the plugboard surmounts the elastic force of spring to move down; under the elastic force, the four conducting shrapnels get close to the center from all around and connect to the four conducting pillars. After located well, the inner pot bottom is in contact with heating plate surface, the five conducting shrapnels are in complete contact with the five conducting pillars, and conducting shrapnel conducts signals via wiring conducting strip to control panel.

Figure 7:
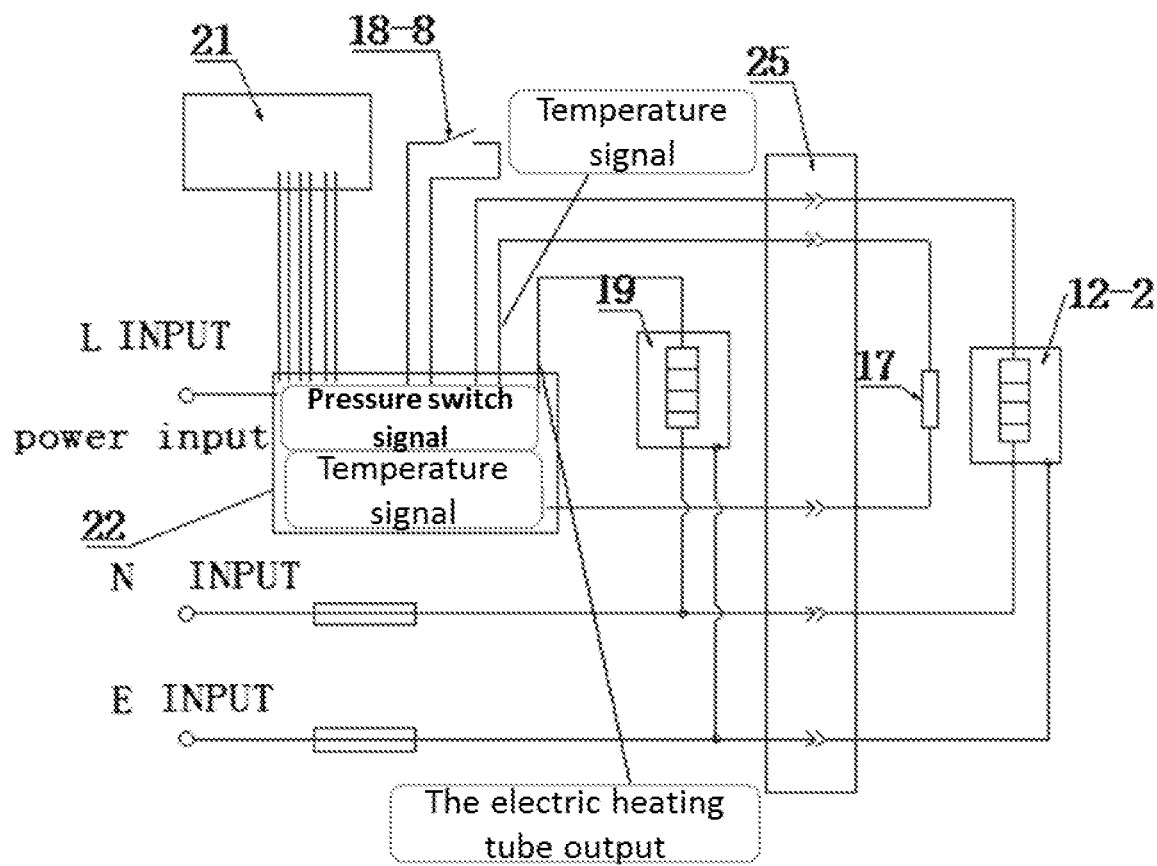
FIG. 7 is the circuit diagram of this invention.

Thereinto, as shown in FIG. 7, circuit board for operation display 21 is installed in control panel 18-2, power supply and in-out circuit board 22 is installed at the pedestal and connected with datawire, thermistor is connected at the temperature signal input terminal of power supply and in-out circuit board, pressure switch is connected at the pressure signal input terminal of power supply and in-out circuit board, heating tube and heating plate are connected at the heating output control terminal of power supply and in-out circuit board, by the use of connectors 25. The thermistor and heating tube are installed in the connector plug of inner pot. When inner pot is located, thermistor, heating tube, grounding and circuit board can be connected with connectors.

Compared with current technology, this invention adopts the method of increasing auxiliary heater inside the inner pot, so as to heat food directly through thermal radiation of auxiliary heater; it can heat spice and make the effect of fuming food; it can reheat steam inside the pot, so as to form superheated steam, increase cooking temperature, and make food cook thoroughly more quickly; it can assist with the bottom heater to heat water directly in the pot, increase convection points, make water temperature in the pot more steady and balanced, so as to be suitable for cooking at low temperature within the temperature range of 50-70° C., and prove to have better performance.

The above description is only the preferred embodiments of this invention, it should be noted that without departing from the creative concept of this invention, those of ordinary skill in the art can also make a number of modifications and improvements, which shall also fall within the scope of protection of this invention.

What is claimed is:

1. An electric pressure cooker with auxiliary heater, comprising pot cover subassembly, pot body subassembly, built-in heating plate subassembly and inner pot subassembly, characterized in that the inner pot subassembly comprises inner pot, auxiliary heater and connector plug corresponding to auxiliary heater, the pot body is provided with connector socket corresponding to connector plug; wherein the heating tube subassembly comprises tube shell, resistance thermal fuse, current-conducting rod, heating tube conducting pillar; thermal fuse is provided in the inner middle of tube shell, insulative materials are filled up between the inner wall of tube shell and resistance thermal fuse, the tube nozzle is encapsulated with insulative damp-proof silica gel, the two ends of resistance thermal fuse are winded at the current-conducting rod.

2. The electric pressure cooker with auxiliary heater according to claim 1, characterized in that the auxiliary heater comprises charging barrel, heating tube subassembly; heating tube subassembly is connected with connector plug.

3. The electric pressure cooker with auxiliary heater according to claim 1, characterized in that the two ends of the heating tube subassembly are welded at a heating tube pedestal, the heating tube pedestal is welded with four screw bolts, and the bottom of heating tube pedestal is stacked up with silica gel pad; the bottom center of inner pot is provided with a raised platform with apertures; the tube shell of heating tube subassembly penetrates through apertures from the inner pot, connector plug is fixed at the corresponding place outside the inner pot, and the parts are fastened with nuts.

4. The electric pressure cooker with auxiliary heater according to claim 1, characterized in that the connector plug comprises connector plug shell and built-in heating tube conducting pillar, conducting pillar for temperature sensor and grounded conducting pillar, heating tube conducting pillar is connected with current-conducting rod, conducting pillar for temperature sensor is connected with thermistor, the shell of connector plug is provided with heating tube pedestal cover corresponding to heating tube subassembly, various conducting pillars penetrate heating tube pedestal cover and are pressed with thermistor silica gel pad, then they are fastened with lock catch on the outer shell of connector plug.

5. The electric pressure cooker with auxiliary heater according to claim 1, characterized in that the connector socket comprises connector assembly, bayonet cap, connector assembly built-in shrapnel subassembly, plugboard, spring, mutually corresponding locating pins are designed in the middles of connector assembly and bayonet cap, connector assembly and bayonet cap are distributed up and down, the upper part of spring is knotted into locating pins of connector assembly, the lower part of spring is knotted into locating pins of bayonet cap.

6. The electric pressure cooker with auxiliary heater according to claim 5, characterized in that the shrapnel subassembly comprises conducting shrapnel, wiring conducting strip connected with conducting shrapnel, conducting shrapnel and wiring conducting strip riveted with rivets.

7. The electric pressure cooker with auxiliary heater according to claim 5, characterized in that the locating pins are designed with inner cavity, provided with grounded shrapnel, grounded shrapnel connected with wiring conducting strip, grounded shrapnel fixed with bolts to the center of bayonet cap; the upper part of bayonet cap fixed with screws to connector assembly.

8. The electric pressure cooker with auxiliary heater according to claim 1, characterized in that the pot body comprises shell subassembly, pedestal subassembly and heat preservation hood subassembly, the upper limb of pot body is provided with upper seat corresponding to pot cover, and shell subassembly comprises shell, control panel and pot body handle; pedestal subassembly comprises pedestal and baseplate fixed onto the pedestal; heat preservation hood subassembly comprises heat preservation hood, middle ring, pressure switch and support, the upper limb of heat preservation hood is designed with outstretched turnup, embedded with middle ring; the shell is fixed between pedestal and upper seat, heat preservation hood is fixed between inner pot and pot body, connector socket is provided on the heat preservation hood; heating plate subassembly comprises heating plate, plate spring fixed at the downside of heating plate, pressure switch and support fixed below heat preservation hood, with flexible connection onto heating plate.

9. The electric pressure cooker with auxiliary heater according to claim 1, characterized in that the inner pot is provided with cooking shelf, whose middle is designed with apertures for penetration of auxiliary heater.

* * * * *